Patented Jan. 15, 1952

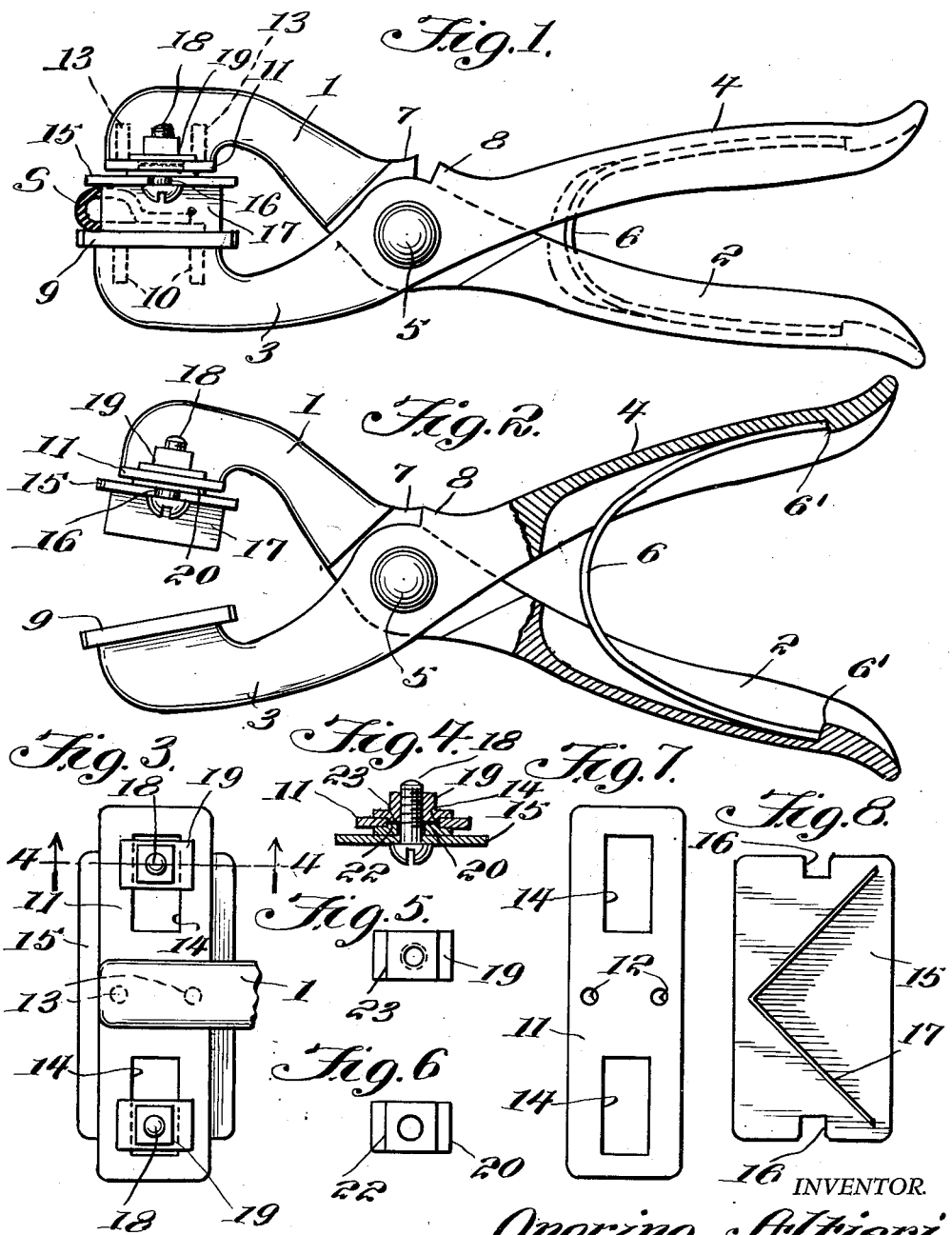

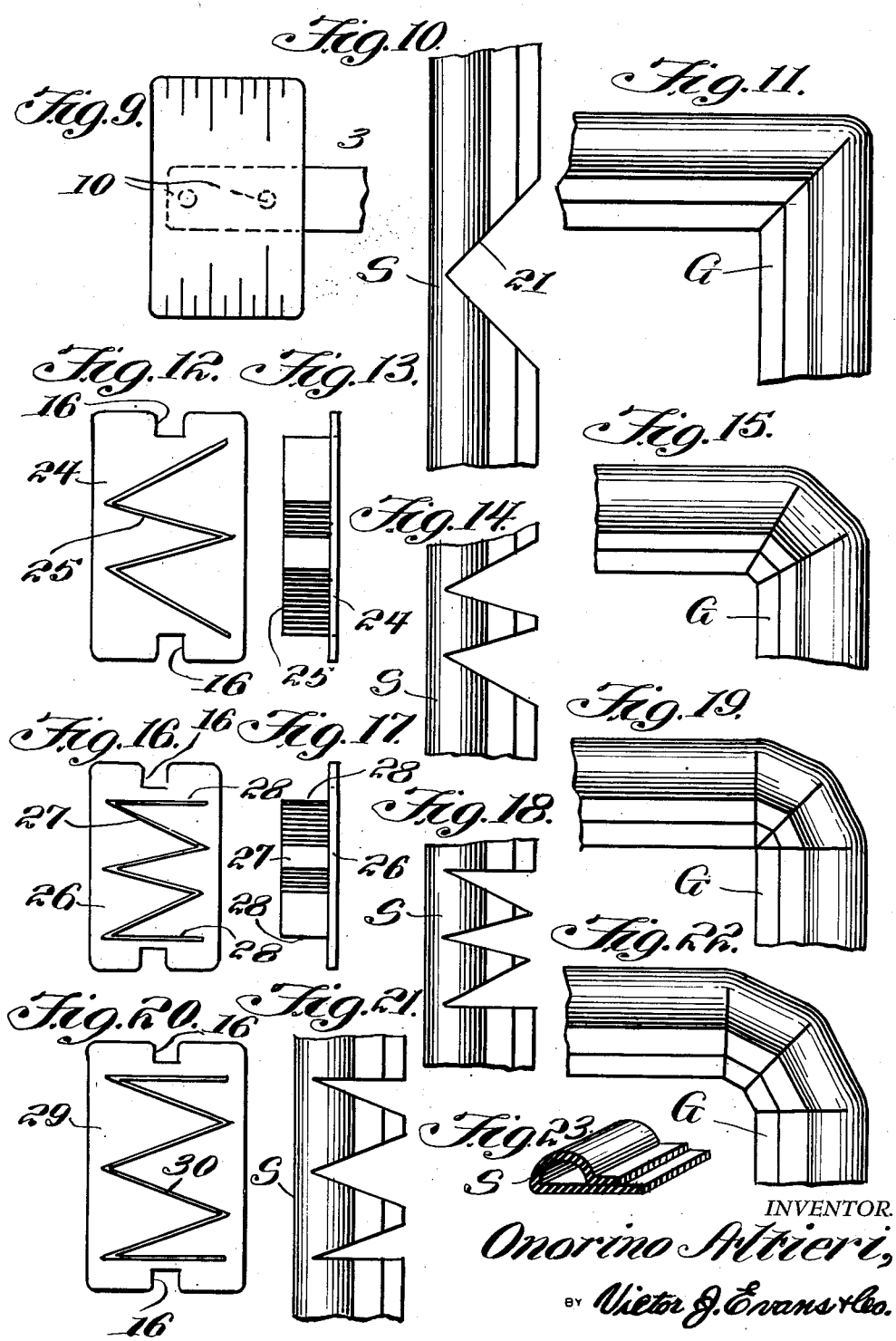

2,582,736

UNITED STATES PATENT OFFICE 2,582,736

DOOR-GASKET CORNER CUTTING TOOL

Onorino Altieri, Cecil, Pa., assignor of one-half to Leonard Rettinger, Cecil, Pa.

Application February 20, 1948, Serial No. 9,917

1 Claim. (Cl. 30—178)

The present invention relates to cutting tools of the pivoted shears type in the general class of cutlery, and more specifically to an improved door-gasket corner cutting tool which, while well adapted for various purposes and uses, is especially designed for partially cutting, or notching, strips of flexible or pliable material, as rubber, for use in forming or fashioning accurate, neat, and perfectly finished corners in gaskets. The hand tool of my invention is primarily useful as a time and labor saving appliance, by various craftsmen, in cutting angular or zigzag notches in a straight strip of material in order that the notched strip may be infolded to form the finished corner of a gasket to be applied to a refrigerator door, deep-freeze cabinet doors, and other similar closures requiring a sealing gasket. For this purpose the tool may be employed in the manufacture of this type of doors, and it may also be utilized by a repairman in making replacements for worn sealing gaskets of various doors.

The cutting tool includes a minimum number of parts and interchangeable cutters or dies of various sizes and shapes that may be manufactured with facility and low cost of production, and the parts may be assembled and interchanged with convenience, to insure a tool that may be manipulated with ease and speed in the performance of its functions.

The invention consists in certain novel features of construction and combinations and arrangements of parts as will hereinafter be described, illustrated in the drawings, and more particularly set forth in the appended claim.

In the accompanying drawings I have illustrated a complete example of a physical embodiment of my invention, with its interchangeable parts, in which the parts are combined and arranged in accord with one mode I have devised for the practical application of the principle of the invention. It will however be understood that various changes and alterations are contemplated and may be made in these exemplifying drawings and mechanical structures, within the scope of my claim, without departing from the principles of the invention.

Figure 1 is a view in side elevation of a cutting tool in which my invention is embodied, showing the jaws closed, and cutting a sealing strip that is shown in section.

Figure 2 is a view of the tool with the jaws open, and the handles broken away for convenience in illustrating the retracting spring for the jaws.

Figure 3 is a top plan view of the cutter or cutting die mounted on one of the jaws; and Figure 4 is a transverse sectional view at line 4—4 of Fig. 3 showing one of the two fastening devices for mounting an interchangeable die or cutter on its jaw.

Figures 5 and 6 are respectively detail views of a clamp nut and an attaching washer employed in mounting the quick-detachable cutter or die on its jaw.

Figure 7 is a plan view of the attaching plate for the cutter; and Figure 8 is a bottom plan view of one of the interchangeable cutters as used in Figs. 1 and 2.

Figure 9 is a plan view of the base, which forms a gauge for the strip to be cut, showing its attachment to a jaw.

Figure 10 is a plan view of a fragment of a sealing strip having a right-angle notch cut therein; and Figure 11 shows a corner of a gasket that has been infolded from the strip of Fig. 10.

Figures 12 and 13 are respectively a plan view and a side view of a zig-zag cutter or die.

Figure 14 shows a portion of a strip with two spaced V-notches cut therein; and Figure 15 shows a corner of a sealing gasket infolded from the strip of Fig. 14.

Figure 16 and Figure 17 show respectively a plan view and a side view of a zig-zag cutter with parallel ends adapted to cut the notches in the strip of Figure 18, from which the gasket corner in Figure 19 is fashioned; and Figure 20 is a plan view of a zig-zag cutter with parallel ends, of larger size than the interchangeable cutter of Fig. 16.

Figure 21 shows a portion of a sealing strip from which a central V-notch and two spaced half V-notches have been cut by an interchangeable cutter; and Figure 22 illustrates the corner of a gasket fashioned from this notched strip.

Figure 23 is a perspective view of a sectional fragment of an infolded or tubular sealing strip of rubber, or other flexible and pliable material, from which the gaskets are formed or fashioned.

In carrying out my invention I preferably employ a hand tool of the pivoted or shears type that includes a jaw 1 having a semi-tubular handle 2; a second jaw 3 having a complementary handle 4; and these parts are pivoted together at 5 in usual manner. Within the tubular handles a U-shaped compression spring 6 is enclosed, and the ends of this bowed spring are retained by shoulders 6' of the handles, so that the compressed spring may retract or withdraw the jaw 1 of the cutter or die from the notched strip S. The handles are pressed together for a cutting or notching operation, and the pivotal movement of the tool is limited by co-action of two stop lugs 7 and 8 on the pivotal parts.

The cutting tool is equipped with a base plate 9, (Fig. 9) of rectangular shape, which plate or anvil or rest is provided with a central pair of holes to receive rivets 10, or other suitable means for rigidly attaching the base plate to the jaw 3, and measuring scales are marked on the base plate as guides in adjusting the strip S on the base for notching.

The cutter jaw 1 is equipped with an attaching plate 11 (Fig. 7), of oblong shape, and this plate is rigidly mounted on the jaw by means of a pair of holes 12 through which fastening rivets 13 are passed for securing the plate on the jaw, or other suitable means may be employed as desired. The attaching plate, to which the interchangeable cutters or dies are to be applied or affixed is provided with a pair of longitudinally spaced rectangular slots 14, 14; and one of these cutters or dies, as 15 in Fig. 8, is shown mounted on the cutting jaw.

The quick-detachable and interchangeable cutters or dies of different sizes and shapes are equipped with end notches 16, 16, that register with the slots 14, 14 of the attaching plate 11, and the particular die plate 15 in Fig. 8 is provided with a simple comparatively wide angular cutting blade 17 that is designed to cut a right-angle notch, as 21 (Fig. 10) in the strip S, for infolding the notched strip to form the right-angle corner of the gasket G in Fig. 11.

The interchangeable dies or cutters are selectively attached to the attaching plate 11 by means of two screw-bolts 18 and nuts 19 together with a uniting washer 20, and the screw bolts are passed up through the notched ends of die plate 15 and through the bolt holes of the lugs of the coupling washers or flanges 20; the washer and the nut of each bolt having squared lugs 22 and 23 fitted within the walls of the slots 14 in the attaching plate 11 and flanges extended over the said attaching plate to provide a rigidly clamped and united die structure or cutter.

As indicated in Fig. 1 the strip S to be notched is accurately adjusted by means of the scales, on the base plate 9, and the cutting jaw and cutter are pressed down on the strip to nip a notch, or notches, in the inner edge of the folded tubular strip.

For different sizes of strips, different sizes of interchangeable cutters are employed; and for the formation, or fashioning corners of various shapes in a gasket G, the cutting blades of the cutters or dies are made of various shapes.

In Fig. 12 the die plate is equipped with a zig-zag cutting blade 25 that is adapted to nip a pair of adjoining V-shaped notches; while in Fig. 16 the smaller die plate 26 is equipped with a zig-zag blade 27 having ends 28, 28 that are parallel, and this cutter is adapted to cut the three notches in Fig. 18 so that this strip may be folded into the corner of the gasket G in Fig. 19 where the corner has two angular sides.

In Fig. 20 a cutter plate 29 is equipped with a larger blade 30 than the blade in Fig. 16, for use with a comparatively wide strip S. In Figs. 14 and 18 respectively, the strip has been nipped to form two spaced V-notches, and to form three spaced notches, for infolding into corners indicated in Figs 15 and 22.

Having thus fully described my invention, what I claim as new and desire to secure by Letters Patent is:

In a door gasket corner cutting tool, the combination which comprises a pair of pivotally connected handles having die carrying jaws extended beyond the pivotal connections thereof, one of said jaws having a base plate providing an anvil thereon and the face of said anvil being in a plane extended through the pivotal connection of the handles and positioned midway between the handles with the tool in the closed position, the other of said jaws which carries the cutting dies having an elongated rectangular shaped attaching plate with spaced slots therein transversely positioned on the face thereof, a cutting die having an elongated base plate with notches in the ends spaced from and positioned below said attaching plate, lugs having shoulders with flat sides positioned in the slots of the said attaching plate and said lugs having flanges extended from the edges and positioned between the attaching plate and face plate of the die, coacting lugs having threaded holes therein and also having flanges extended from the edges positioned with the lugs also extended into the slots of the attaching plate and with the flanges extended over the said attaching plate, said coacting lugs also having flat sides positioned to engage the slots of the attaching plate, and the lugs with the flanges positioned between the attaching plate and base plate of the die having bolt holes therethrough positioned in registering relation with the threaded holes of said coacting lugs, and bolts positioned in the notches in the ends of the base plate of the die, and extended through said lugs with the bolt holes therein and threaded into the lugs having the threaded holes therein for adjustably clamping the die to the said attaching plate.

ONORINO ALTIERI.

REFERENCES CITED

The following references are of record in the file of this patent:

UNITED STATES PATENTS

| Number | Name | Date |
| --- | --- | --- |
| 85,575 | Drake | Jan. 5, 1869 |
| 267,282 | Tigniere | Nov. 7, 1882 |
| 787,348 | Hansen | Apr. 11, 1905 |
| 1,501,948 | Hill et al. | July 22, 1924 |